May 17, 1949.         S. GABRIELSON         2,470,482
DIRECTION INDICATOR
Filed Sept. 20, 1946
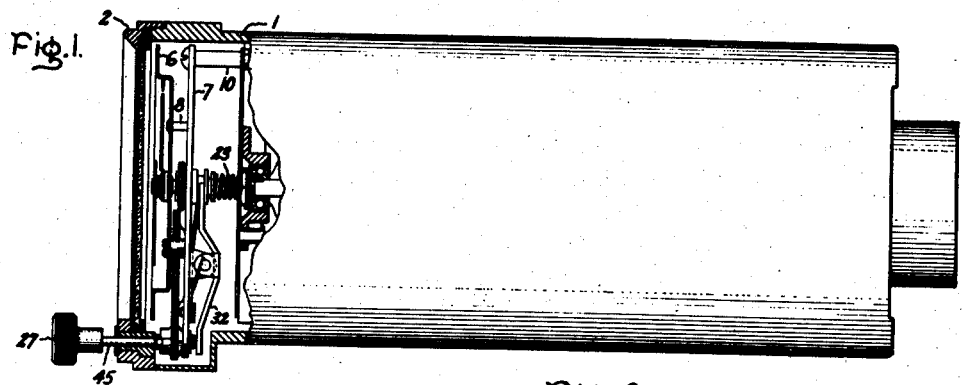
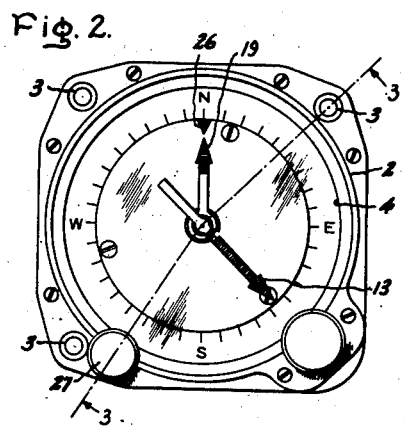
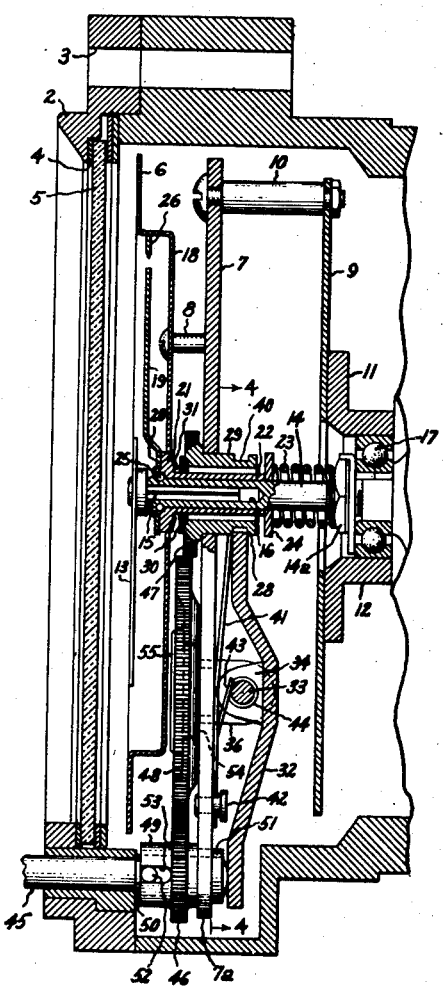
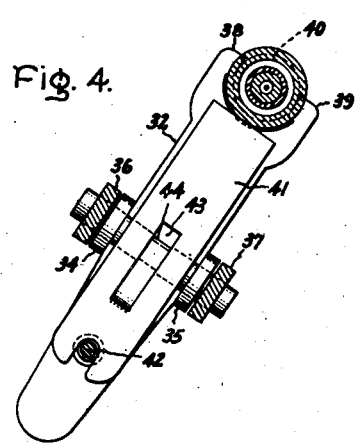
Inventor:
Samuel Gabrielson,
by *Clarke H. Nett*
His Attorney.

Patented May 17, 1949

2,470,482

UNITED STATES PATENT OFFICE 2,470,482

DIRECTION INDICATOR

Samuel Gabrielson, South Lynnfield, Mass., assignor to General Electric Company, a corporation of New York Application September 20, 1946, Serial No. 698,129

5 Claims. (Cl. 116—129)

The present invention relates to navigational instruments and more particularly to direction or azimuth indicating instruments used for guiding moving vehicles such as aircraft.

In a copending application of Edward E. Lynch, Serial No. 595,719, filed May 25, 1945, which is assigned to the same assignee as the present invention, there is disclosed and claimed a direction-indicating instrument having a novel two-pointer system for indicating the direction or heading of a vehicle and also departures of the heading from a preselected course. One of the pointers is mounted on a direction-responsive, rotatable shaft and indicates direction against the stationary dial in a conventional manner. The other pointer, called a course-indicating pointer, is also mounted on the direction responsive shaft but is adjustably mounted on the shaft so that it can always be brought around to a predetermined course indicating position regardless of the direction of the first pointer. With this arrangement, deviations of the vehicle from a preselected course always cause the same sense of movement of the course-indicating pointer relative to its index so that it is easier for a pilot to control a vehicle while observing the direction indicator. In the Lynch application the course-indicating pointer is adjusted by means of a clutching arrangement which is fastened to and extends through a center portion of the cover glass on the front of the direction-indicating instrument.

An object of the present invention is to provide a direction indicator of the two-pointer type having a different arrangement for adjusting the course-indicating pointer relative to the direction indicator, which is an improvement over the arrangement disclosed in the above-identified Lynch application.

A further object of the invention is to provide an improved direction indicator of the two-pointer type having an adjusting arrangement for the course-indicating pointer which does not pass through the cover glass of the instrument and therefore does not obscure any part of the field of view through the cover glass.

A further object of the invention is to provide a course-setter adjusting mechanism which is reliable in operation and which is easy to manufacture and assemble.

Further objects and advantages of the invention will become apparent and the invention will be better understood from the following description, referring to the accompanying drawing, and the features of novelty which characterize the invention will be pointed out with particularity in the claims annexed to and forming a part of this specification.

In the drawing Fig. 1 is a side elevation view partly in section of a direction indicator having a course-indicating pointer and an adjusting mechanism therefor embodying the present invention.

Fig. 2 is a front view of the instrument shown in Fig. 1.

Fig. 3 is an enlarged side elevational view looking in the direction of the arrows 3—3 of Fig. 2 and showing certain details of the construction of the adjusting mechanism, and Fig. 4 is a sectional fragmentary view looking in the direction of the arrows 4—4 of Fig. 3.

Referring to the drawing, I have illustrated a preferred embodiment of my invention in connection with a direction indicating instrument of the gyroscopically actuated type known in the art as a directional gyro. The instrument comprises a cylindrical casing 1 which is adapted to be inserted in an opening in the dash panel of an aircraft. Attached to the open front of the casing is a circular face plate 2 provided with mounting holes 3 adapted to receive mounting bolts by means of which the instrument is fastened to the dash panel. The face plate 2 is provided with a circular opening or window 4 through which readings of the instrument are viewed by the pilot or other observer. A cover glass 5 is provided to seal the instrument and to prevent damage to the indicating parts thereof.

In instruments of this type the direction indication is usually presented in terms of compass headings with the north and south directions marked at the top and bottom and the east and west directions at the right and left, respectively, as viewed by an observer facing the instrument. This convention is usually followed to facilitate navigating by reference to conventional maps. In the present instrument the compass headings are carried upon a fixed vertical dial 6 which is mounted on a stationary circular plate 7 by supporting posts one of which is indicated at 8. The supporting plate 7 is in turn held in spaced parallel relation with a second supporting plate 9 by means of a plurality of supporting posts one of which is shown at 10. The plate 9, which is annular in shape, is secured to an upstanding flange 11 of a hollow central section 12 of the frame which is supported in the casing 1.

For the purpose of indicating the direction or heading of the vehicle on which the instrument is mounted there is provided a pointer 13 which is mounted on and rotates with a rotatable direction-responsive shaft 14. The pointer 13 is attached to the shaft 14 by means of a slotted pin 15 which is secured to the pointer and which is received in frictional engagement in an axial bore 16 provided in the front end of the shaft 14. This arrangement facilitates assembly of the pointer and shaft.

The shaft 14 extends through a central opening in the dial 6 and is rotatably supported in ball bearings carried in the frame 12, one of the bearings being indicated at 17. As the instrument is rotated in azimuth the shaft 14 is correspondingly rotated by a direction responsive device such as a directional gyroscope. The showing of the directional gyroscope and the linkage coupling the outer gimbal of the gyroscope to the shaft 14 has been omitted since this construction is well known and forms no part of the present invention. Other direction responsive actuating devices can, of course, be used such as for example a magnetic compass, a compass repeater, etc.

With the arrangement as thus far described it will be clear that after the pointer 13 has been initially set to indicate the course heading of the vehicle on which the instrument is mounted, the course of the vehicle will thereafter be indicated by the position of the pointer 13 relative to the compass headings marked on the dial 6. Preferably the dial 6 has a recessed portion 18 to permit the pointer 13 to rotate in a plane which includes the outer part of the dial 6 on which the compass headings are marked. The advantage of this arrangement is that it gives an antiparallax indication.

For the purpose of presenting to the pilot or other observer a convenient and easily interpreted indication of a preselected course heading to be followed, there is provided a second course-indicating pointer 19 which is adjustably mounted on the shaft 14. The pointer 19 has a central portion 20 which is welded or otherwise secured to an upstanding flange 21 forming a part of a hollow bushing 22. The bushing 22 is slidably mounted on the shaft 14 so that the bushing and the pointer 19 can be rotated relative to the shaft 14 and the pointer 13. However, such relative rotation is normally prevented by friction restraining means so that the pointers 13 and 19 rotate in unison. The friction restraining means comprises a compression spring 23 which extends between a nut 14a carried on the shaft 14 and a washer 24 which bears against the inner end of the bushing 22. The spring 23 exerts a force pushing the bushing 22 outwardly until it frictionally engages a locking ring 25 carried in a circular groove adjacent the outer end of the shaft 14. As shown, the locking ring extends above the surface of the shaft 14 so that it acts as a stop and preferably the ring is split so that it may be conveniently snapped into position during assembly.

When the vehicle on which the instrument is mounted is oriented in azimuth so that it is headed in a preselected course to be followed, the course-setter pointer 19 is rotated to a predetermined course-indicating position, preferably vertical, in which the outer end of the pointer lies opposite a stationary index 26 depending from the compass dial 6. The setting of the pointer 19 is accomplished manually by means of a knob 27 extending from the front face of the instrument. To effect the adjustment the knob 27 is pushed inwardly and then rotated until the course-indicating pointer 19 is moved into alignment with the stationary index 26. The mechanism by which this is accomplished will now be described.

Surrounding the bushing 22 and the shaft 14 is a hollow clutching member 28 having a cylindrical bearing surface 29 which is received in a central opening in the supporting plate 7 to permit free rotation of the clutching member in radially-spaced relation with the bushing 22. The outer end of the clutching member 28 is provided with a serrated beveled surface 30 forming one face of a clutch. The clutch face 30 is adapted to mate with a complementary, serrated beveled surface 31 provided on the inner face of the upstanding flange portion 21 of the bushing 22. The bearing surface 29 of the clutching member 28 is extended as shown so that the clutching member may be slid forward until the clutch faces 30 and 31 move into engagement. This clutch engaging movement of the clutching member 28 is accomplished by means of a lever 32 which is mounted to rotate on a pivot shaft 33. The pivot shaft 33 passes through two lugs 34 and 35 extending forwardly from the lever and two lugs 36 and 37 extending rearwardly from the circular supporting plate 7. The upper end of the lever 32 is yoke-shaped and is provided with two inwardly extending arms or jaws 38 and 39 which are received in a circular groove 40 provided in the clutching member 28. The clutching member 28 is normally biased to a rearward disengaged position by means of a leaf spring 41. The lower end of the spring 41 is slotted to receive in detachable relation a rivet 42 fastened to the supporting plate 7, the spring being initially warped or bent so that the upper end presses against the upper end of lever 32 forcing the clutching member 28 rearwardly to the disengaged position.

In order to provide an easily disassembled arrangement for holding the pivot shaft 33 in position, the center portion of the leaf spring 41 is provided with a rearwardly extending tongue 43 which is received in a central groove 44 provided in the pivot shaft. The tongue 43 is bent so that it tends to remain in the groove 44 and prevents endwise movement of the pivot shaft. However, when it is desired to disassemble the lever 32 and the attached mechanism it is only necessary to spring the upper end of the tongue forward so that it moves out of the groove 44 whereupon the pivot shaft 33 may be slid axially to effect disconnection of the assembled parts.

The course-setter knob 27 is mounted on the outer end of a shaft 45 which passes through a suitable opening in the front face of the instrument, the shaft being arranged so that it can be rotated and moved axially by manual adjustment of the knob. The inner end of the shaft 45 engages the lower end of the lever 32 so that when the knob 27 is pushed inwardly the lever 32 is pivoted counterclockwise to cause a forward movement of the clutching member 28 engaging the clutch surfaces 30 and 31.

In order to transmit the rotary movement of the shaft 45 to the clutching member 28 to effect the rotary adjustment of the course-setter pointer 19 there is provided a gear train comprising pinion gears 46 and 47 arranged to mesh with an intermediate or idler gear 48. The pinion gear 46 engages the lower surface of the idler gear 48 and is formed as a part of a hollow bushing 49 which is slidably mounted on an enlarged portion 50 of the shaft 45. The rearward end of the bushing 49 has a portion of reduced diameter 51 which extends through a circular opening in a semicircular tab 7a extending downwardly from the supporting plate 7. This arrangement permits the bushing 49 and the gear 46 to be rotatably supported by the tab 7a and at the same time it permits the enlarged portion 50 of the shaft 45 to be slid axially through the gear to effect the clutch engaging and disengaging movement of the clutching member 28. The gear 46 is keyed to the shaft 45 by means of a pin 52 which rides in an elongated slot 53 in the bushing 49, the slot permitting axial movement of the shaft 45.

The idler gear 48 is rotatably supported on a shoulder stud 54 which is assembled through the gear and riveted to plate 7. The head 55 of the stud holds the gear in position.

The pinion 47 is mounted on and preferably forms a part of the clutching member 28, the arrangement being such that the pinion 47 meshes with the upper surface of the idler gear 48. By design the width of the pinion gear 47 relative to the width of the idler gear 48 is selected such that the clutching and declutching movement of the clutching member 28 does not cause the pinion 47 to move out of mesh with the idler gear 48.

It will be understood that after the clutch faces 30 and 31 are engaged and rotated by pushing in and rotating the knob 27, the frictional restraint normally preventing rotation of the bushing 22 on shaft 14 is overpowered to permit rotation of the course-indicating pointer 19 relative to the direction-indicating pointer 13 about the axis of shaft 14. After the pointer 19 has been set opposite the stationary index 26 the knob 27 is released and the clutching member 28 moves to the disengaged position under the influence of biasing spring 41. Outer axial movement of the shaft 45 is limited by engagement of the enlarged portion 50 of the shaft 45 with the inner surface of the face plate 2 while inner axial movement is limited by engagement of the lower end of lever 32 with the frame.

By the expedient of mounting the course-indicating pointer between the direction-indicating pointer and the compass dial and actuating the course-setting pointer by a clutching member mounted behind the dial, I have provided an improved adjusting arrangement which does not require mechanism passing through the cover glass so that an unobstructed view of the course-indicating pointer is obtained.

While I have illustrated and described a particular embodiment of my invention modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States, is:

1. In a direction indicating instrument a fixed dial, a rotatable direction-responsive shaft extending from the rear through an opening in said dial, a first pointer rigidly secured to said shaft for indicating direction, a second course-indicating pointer mounted on a bushing carried by and rotatable with said shaft so as to rotate between said first pointer and said dial, and means located behind said dial for engaging and rotating said bushing about said shaft for effecting a rotary adjustment of said second pointer relative to said first pointer.

2. The combination with a direction indicating instrument of the type having a fixed dial, a rotatable direction-responsive shaft extending through a hole in said dial from the rear and a pointer attached to said shaft in front of said dial for indicating direction on said dial, of a second course-indicating pointer mounted in front of said dial on a bushing member carried on said shaft, means for frictionally restraining said bushing member so that it normally rotates with said shaft, a hollow clutching member surrounding a portion of said bushing member and rotatably supported in back of said dial, said clutching member being normally biased to a position in which it is spaced from said bushing member, and manually operated means for causing engagement of said clutching member with said bushing member and for rotating said clutching member whereby to effect a rotary adjustment of said second pointer relative to said shaft.

3. The combination with a direction-indicating instrument of the type having a fixed dial, a rotatable direction-responsive shaft extending through a hole in said dial from the rear and a pointer attached to said shaft in front of said dial for indicating direction on said dial, of a second course-setting pointer mounted in front of said dial on a bushing member carried on said shaft, said bushing member extending through said hole in said dial and having extending therefrom a portion forming one face of a clutch, a hollow clutching member surrounding said bushing member and having a portion forming a mating face of said clutch, said clutching member being rotatably supported so that it is radially spaced from said bushing member and axially slidable to cause engagement of the mating faces of said clutch, means for frictionally restraining said bushing member so that it rotates with said shaft, means for biasing said clutching member to a position in which the faces of said clutch are disengaged so that both of said pointers rotate with said shaft, means for axially moving said clutching member to cause engagement of the faces of said clutch and means for rotating said clutching member to adjust said second pointer relative to said shaft.

4. The combination with a direction-indicating instrument of the type having a fixed dial, a rotatable direction-responsive shaft extending through a hole in said dial from the rear and a pointer attached to said shaft in front of said dial for indicating direction on said dial, of a second course-setting pointer mounted in front of said dial on a bushing member carried on said shaft, said bushing member extending through said hole in said dial and having extending therefrom a portion forming one face of a clutch, a hollow clutching member surrounding said bushing member and having a portion forming a mating face of said clutch, said clutching member being rotatably supported so that it is radially spaced from said bushing member and axially slidable to cause engagement of the mating faces of said clutch, means for frictionally restraining said bushing member so that it rotates with said shaft, means for biasing said clutching member to a position in which the faces of said clutch are disengaged so that both of said pointers rotate with said shaft, means for axially moving said clutching member to cause engagement of the faces of said clutch and means for rotating said clutching member to adjust said second pointer relative to said shaft comprising a pinion carried by said clutching member, a rotatable gear meshing with said pinion, the width of said gear being sufficient to permit the required clutch-engaging axial movement of said pinion without unmeshing the pinion and gear and means comprising a manually rotatable shaft for rotating said gear.

5. In a direction indicating instrument a fixed dial, a direction responsive shaft extending through an opening in said dial, a direction-indicating pointer secured to said shaft, a course-indicating pointer mounted on a bushing carried on said shaft, said bushing being rotatable relative to said shaft but frictionally coupled thereto so relative rotation between said bushing and said shaft normally does not occur, a rotatable hollow clutching member surrounding said bushing and axially movable into engagement with said bushing member, said clutching member being located behind said dial, a control shaft operable from the front of said instrument arranged for axial and rotary movement, means responsive to an axial movement of said control shaft for moving said clutching member into engagement with said bushing member, and means responsive to a subsequent rotary movement of said control shaft for rotating said clutching and bushing members to overpower the restraining friction between said bushing and said direction-responsive shaft to effect a rotary adjustment of said course-indicating pointer relative to said direction-indicating pointer.

SAMUEL GABRIELSON.

REFERENCES CITED

The following references are of record in the file of this patent:

UNITED STATES PATENTS

| Number | Name | Date |
|---|---|---|
| Re. 19,079 | Kollsman | Feb. 13, 1934 |
| 1,857,311 | Kollsman | May 10, 1932 |
| 2,334,116 | Meredith | Nov. 9, 1943 |